United States Patent
van Duuren et al.

[11] 4,003,041
[45] Jan. 11, 1977

[54] SYSTEM FOR CONVERTING BINARY SIGNALS INTO SHORTER BALANCED TERNARY CODE SIGNALS

[76] Inventors: Henrik Cornelis Anthony van Duuren, Zomerland-flat 330, Raaphorstlaan 25, Wassenaar; Herman da Silva, Agrippinastraat 34, Voorburg, both of Netherlands

[22] Filed: Dec. 30, 1974

[21] Appl. No.: 537,399

Related U.S. Application Data

[63] Continuation-in-part of Ser. No. 354,250, April 25, 1973, abandoned.

[52] U.S. Cl. .................. 340/347 DD; 325/38 A; 178/68
[51] Int. Cl.² .......................................... H04L 3/00
[58] Field of Search .......... 340/347 DD; 325/38 A; 178/66 R, 68

[56] References Cited
UNITED STATES PATENTS

| | | | |
|---|---|---|---|
| 2,518,405 | 8/1950 | van Duuren | 178/2 B |
| 3,599,205 | 8/1971 | van Duuren | 340/347 DD |
| 3,631,463 | 12/1971 | Murphy | 325/38 A |
| 3,783,383 | 1/1974 | Forster et al. | 325/38 A |
| 3,863,025 | 1/1975 | Gonsewski et al. | 325/38 A X |
| 3,866,147 | 2/1975 | De Couvreur et al. | 325/38 A X |

*Primary Examiner*—Thomas J. Sloyan

[57] ABSTRACT

A system for converting multi-unit 1 and 0 bit binary code signals into one less unit multi-unit 0, + and − bit ternary code signals with a D.C. (direct current) component and having the same number of 0-bits or units in each signal. This conversion is accomplished by dividing each binary word code or signal into two groups of units or bits, converting one group to form a balance code with one less unit or bit than the binary code and a constant number of 0-bits, and converting the other part of each binary word for controlling the conversion and distribution of the + and − bits from the 1-bits in the code words of the first group. In the event there are more + bits than − bits or vice versa in a code word, an inverter is provided for inverting the + and − bits in the next word containing the same unbalance of + and − bits, so that any D.C. component produced by such an unbalance in one word will be eliminated or counterbalanced by inverting the next following word with the same unbalance.

10 Claims, 4 Drawing Figures

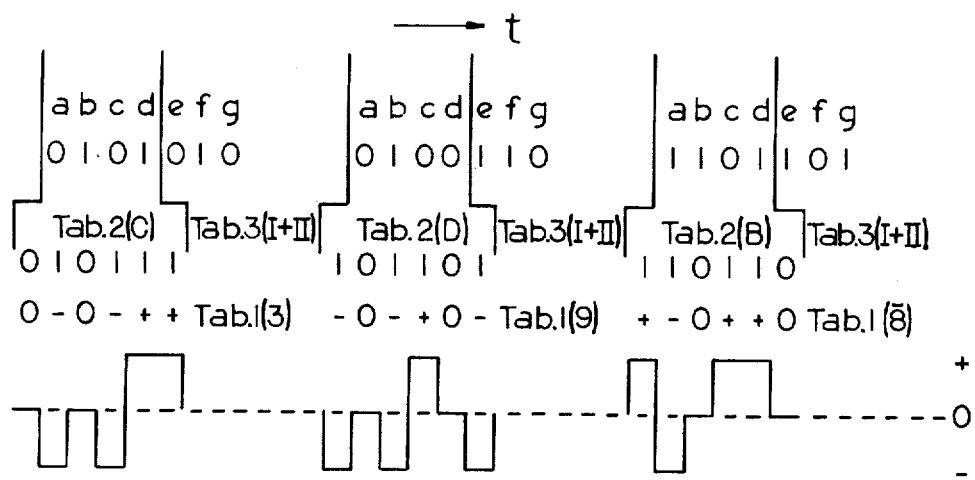
FIG. I
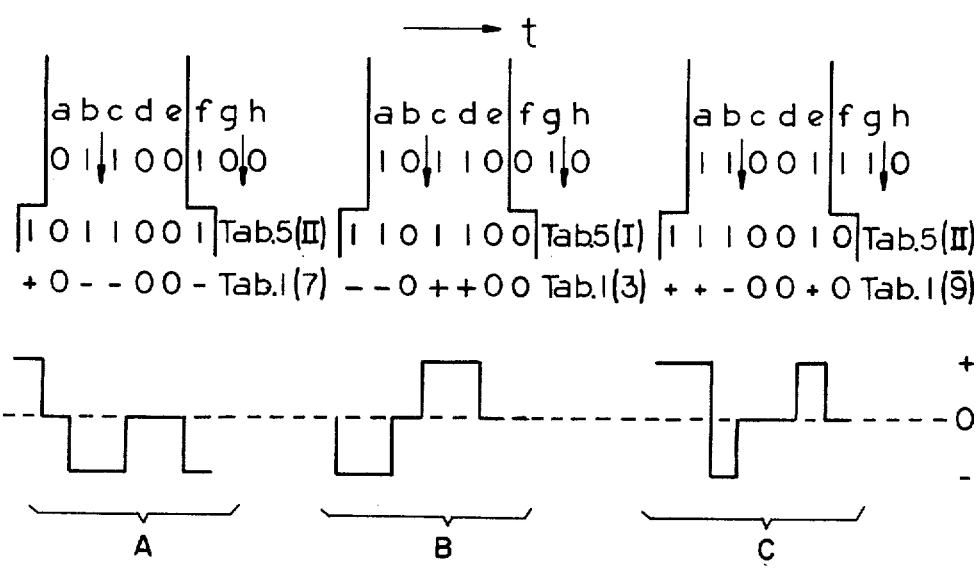
FIG. II

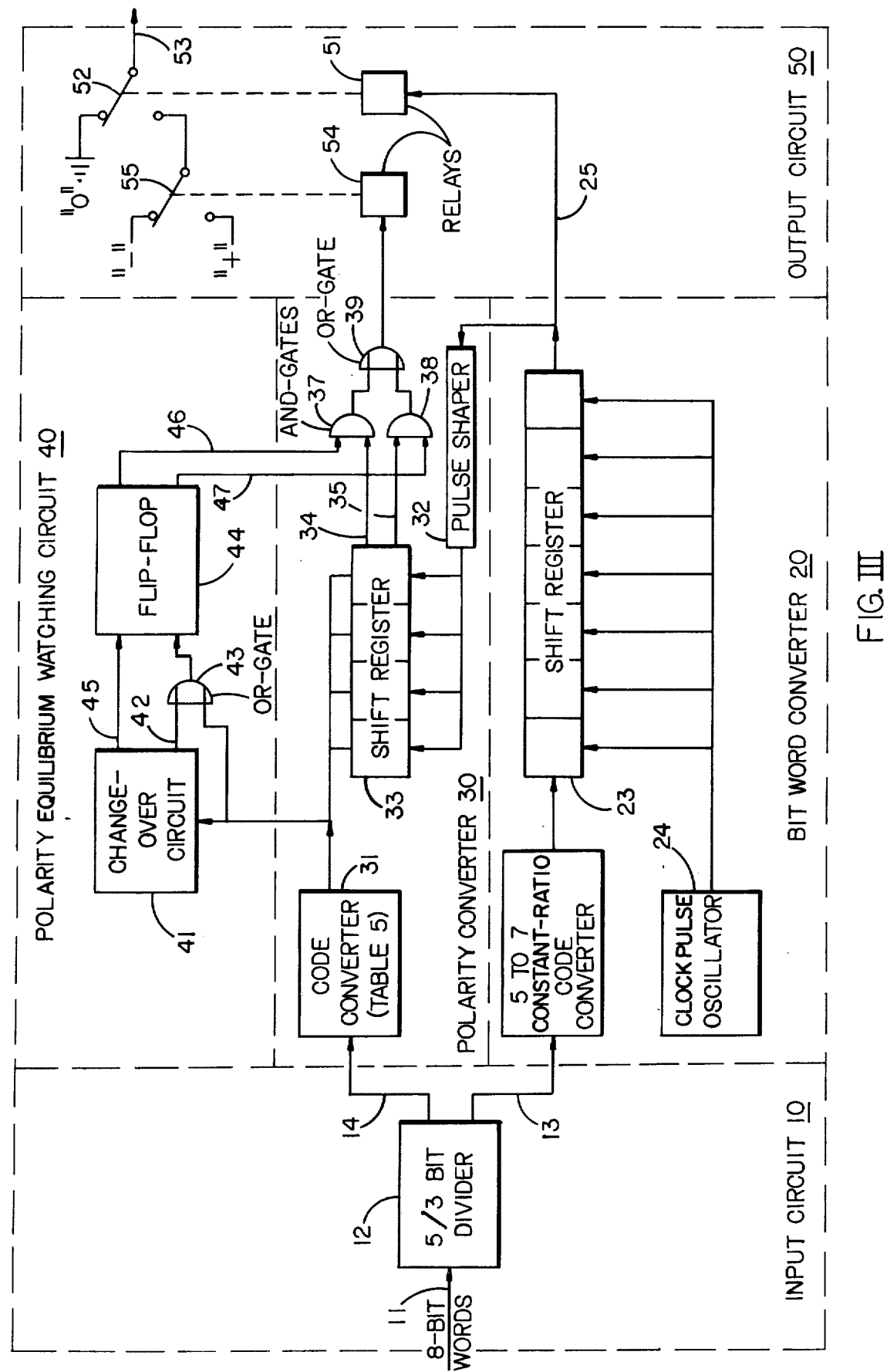
FIG. III

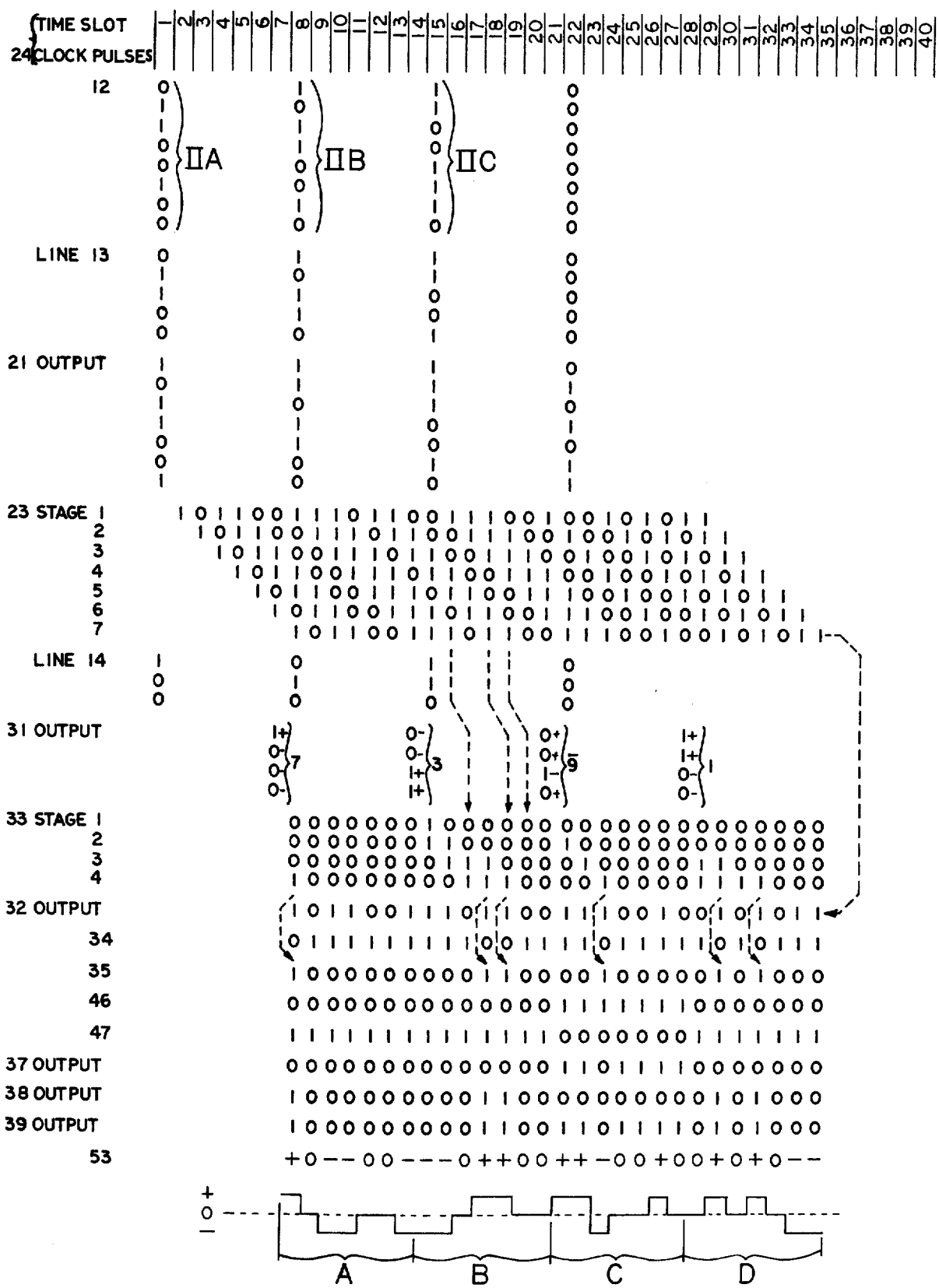
FIG. IV 4,003,041

SYSTEM FOR CONVERTING BINARY SIGNALS INTO SHORTER BALANCED TERNARY CODE SIGNALS

RELATED APPLICATION

This is a continuation-in-part of applicants' copending application Ser. No. 354,250 filed Apr. 25, 1973, now abandoned.

BACKGROUND OF THE INVENTION

According to applicants' U.S. Pat. No. 3,599,205 issued Aug. 10, 1971, a binary code is converted into a ternary balanced code but the code word in each code has the same number of bits, and there is no means for eliminating any D.C. component.

SUMMARY OF THE INVENTION

This invention relates to a system for converting binary code signals having a specified number of bits per signal of more than three, first into binary code signals with a constant 0-bit/1-bit ratio in which each code word has one-bit less than that of the binary code, and then into a ternary code which is without a D.C. component. This is accomplished by dividing the binary code words into two groups of bits, such as for example in a code having more than three, and preferably more than 6-bits per word, into a first group of bits comprising $n-3$ bits in each word and a second group of the last three bits of each word. The first group of bits of each word is then converted by a bit word converter into the balance binary code having a same number of 0 and 1-bits for a code having $n-1$ bits per word, namely the same number of bits as the ternary code to be produced. Then the second group or last 3-bits of the binary word is used to convert by a polarity converter the 1-bits in the converted first group word into the + and − bits of the first ternary code. There is also provided a polarity equilibrium watching circuit comprising an inverter which alternately inverts the + and − converted bits in a signal word when the number of + and − bits per signal word are uneven, thereby in the long run preventing the formation of a D.C. component in a succession of converted ternary code signals.

The code converters for the two different groups of bits of the divided binary code signal include shift registers, and the inverter comprises a flip flop. The shift register for forming the + and − bits from the 1-bits, controls relays to operate switches for successively connecting the out-put to ground or 0 potential, − potential, or + potential. Thus the different levels from the out-put may be used for controlling amplitudes or frequencies which are different than that for the ground or 0-bits.

Accordingly, it is an object of this invention to convert a binary code into a balanced ternary code of less bits per word than the binary code in a simple, efficient, effective and economic manner.

Another object is to convert a binary code into a ternary code in which each signal word has a constant number of 0-bits and a substantially even number of + and − bits, at least after the second word having the same unbalance of + and − bits has been produced and transmitted.

BRIEF DESCRIPTION OF THE VIEWS

FIG. I is a schematic table and wave form of direct samples of single words for the conversion of a seven unit binary code into a six unit ternary unit code according to one embodiment of this invention;

FIG. II is a schematic table and wave form of direct samples of single words for the conversion of an eight unit binary code into a seven unit ternary code unit according to another embodiment of this invention;

FIG. III is a schematic block wiring diagram of one embodiment of a circuit for the conversion of an eight bit binary code word into a seven bit ternary code word as shown in FIG. II; and FIG. IV is a detailed time diagram of the conversion of the signals shown in FIG. II according to the specific circuit shown in FIG. III.

DETAILED DESCRIPTION OF PREFERRED EMBODIMENTS

The invention will be described in relation to two examples, namely one for converting a 7-bit binary code into a 6-bit ternary code and the other for converting an 8-bit binary code into a 7-bit ternary code.

I

Conversion of Signals of a 7-bit Binary Code With $2^7 = 128$ Variations Into Signals of a 6-bit Error Detecting Ternary Code According to this example or embodiment of the invention, the first group of bits divided from the 7-bit binary code consists of the first 4-bits of each 7-bit word which 4-bits may contain one, two or three 0-bits. For these first 4-bits which contain none, one, and two 0-bits, the remaining 2-bits of the ultimate 6-bit ternary code are filled-in to insure that the final 6-bit word of the ternary code contains only two 0-bits. In the event the first 4-bits contain three 0-bits, the inversion of this code is then employed (see Table 2-D). However, if all 4-bits are 0-bits, then these binary code words are converted by starting from a second group of bits and by completing this group to new 6-bit ternary code words (see Tables 4 and 3).

Thus, the 6-unit digit, or bit code used on the transmission path is derived from a 6-bit code with a 1-bit/0-bit ratio of 4:2. The three levels at which the ternary transmission takes place are represented by the symbols 0, + and −. The 0 value in the first converted binary code also becomes the 0 value in the ternary code, but the binary 1 value becomes the + or − in the ternary code.

The 6-bit code contains four 1-bits per signal so that the number of possible variations of two or three + bits and two or three − bits in each 6-unit word is $$\frac{6!}{4! \cdot 2!} = \binom{6}{4} = 15.$$

The error detection is obtained by counting the number of 0-bits in the 6-bit signal. This number must be two and deviations from this number indicate an erroneously received signal.

As a number of 1-bits in a 6-bit signal is even, it is possible to establish a balance between the number of + and − bits or digits. This balance can be formed within one signal or after several signals have been converted, so that the D.C. component is eliminated in due time, such as when three + or three − bits occur in one signal, the next signal with three + or three − bits is inverted to three − or three + bits, respectively.

The distribution of the + and − values over the four binary 1-bits takes place as follows:

TABLE 1

|   | | | | binary |
|---|---|---|---|---|
| 1 | + | + | − | − |
| 2 | − | + | + | − |
| 3 | − | − | + | + |
| 4 | + | − | − | + |
| 5 | + | − | + | − |
| 6 | − | + | − | + |

Balanced distribution of "+" and "−" digits or bits

| 7 | + | − | − | − |
| 8 | − | + | − | − |
| 9 | − | − | + | − |
| 10 | − | − | − | + | and their inverse forms

| $\overline{7}$ | − | + | + | + |
| $\overline{8}$ | + | − | + | + |
| $\overline{9}$ | + | + | − | + |
| $\overline{10}$ | + | + | + | − |

For balance, as many of the $\overline{7}, \overline{8}, \overline{9}$ and $\overline{10}$ numbered signals need to be used as possible so the following 7, 8, 9, 10 signals can be the inversions thereof. Thus in due time, a balance of the + and − bits will occur to achieve the elimination of a D.C. component for the whole wave of signals.

The conversion of the signals of the 7-bit binary code into a 6-bit ternary code is achieved as follows:

The 7-bit signals consist of the units or bits $a\,b\,c\,d\,e\,f\,g$. Of these bits a first group containing the bits $a\,b\,c\,d$ is detached or divided out of the 7-bit signals and converted into a 6-bit $$\binom{6}{4}$$

code, the bits of which are indicated by $a\,b\,c\,d\,e\,f$. The $a\,b\,c\,d$ bits can form 16 variations. However, a $$\binom{6}{4}$$

code can only form 15 variations, so that a complete conversion of 4-bits into 6-bits $$\binom{6}{4}$$

is impossible. For this reason the variation 0000 is set apart from the $a\,b\,c\,d$ variation for the time being, and the remaining 15 variations are divided into four groups.

A: one variation with nought 0-bits
B: four variations with one 0-bit
C: six variations with two 0-bits
D: four variations with three 0-bits The conversion from four to six bits takes place by adding two bits, the bits $e$ and $f$, to the bits $a\,b\,c\,d$. In order that the 6-bit variations always contain two 0-bits, the bit-group $e\,f$ gets nought, one, or two 0-bits. This is by simple logic circuits for the variations of the groups A, B, and C above; in which case two, one, or nought 0-bits, respectively, are assigned to the bit-group $e\,f$. Another procedure is applied for the variations of the group D already containing more than two 0-bits. These variations are inverted, so that they appear as variations that contain one 0-bit. Then only one 0-bit has to be assigned to the $e\,f$ group in order to become $$\binom{6}{4}$$

variations. But to distinguish the $e\,f$ configuration for group D from group B, the variation of group B is 1−0 while the variation of the group D is 0 1.

TABLE 2

| Group | a b c d | $\overline{a}\,\overline{b}\,\overline{c}\,\overline{d}$ | e f | |
|---|---|---|---|---|
| A | 1 1 1 1 | | 0 0 | one variation with nought 0-bits |
| B | 0 1 1 1 | | 1 0 | four variations with one 0-bit |
|   | 1 0 1 1 | | 1 0 | |
|   | 1 1 0 1 | | 1 0 | |
|   | 1 1 1 0 | | 1 0 | |
| C | 0 0 1 1 | | 1 1 | six variations with two 0-bits |
|   | 0 1 0 1 | | 1 1 | |
|   | 0 1 1 0 | | 1 1 | |
|   | 1 0 0 1 | | 1 1 | |
|   | 1 0 1 0 | | 1 1 | |
|   | 1 1 0 0 | | 1 1 | |
| D | 1 0 0 0 | 0 1 1 1 | 0 1 | four variations with three 0-bits |
|   | 0 1 0 0 | 1 0 1 1 | 0 1 | |
|   | 0 0 1 0 | 1 1 0 1 | 0 1 | |
|   | 0 0 0 1 | 1 1 1 0 | 0 1 | |

The 1-bits in the 6-bit code obtained in the above-mentioned manner determine the four digit places in the ternary signal, at which + or − values will be transmitted.

The bits $e\,f\,g$ of the 7-bit encoding, remaining after the detachment of the bits $a\,b\,c\,d$, can occur in eight variations with respect to the 1 and 0 values (in column I Table 3). Each of these variations determines which distribution of + and − values, as summed up in Table 1 above, will be attributed to the 1-digits and this is represented in Table 3 (column II)

TABLE 3

| e f g of the 7-bit code | + and − disposition according to Table 1 | e f g bits substituted by a b c bits | complementary bits d e f | $\overline{a}\,\overline{b}\,\overline{c}\,d\,e\,f$ |
|---|---|---|---|---|
| 0 0 0 | 1 | 0 0 0 | | 1 1 1 0 0 1 |
| 0 0 1 | 2 | 0 0 1 | 1 1 1 | |
| 0 1 0 | 3 | 0 1 0 | 1 1 1 | |
| 0 1 1 | 4 | 0 1 1 | 1 1 0 | |
| 1 0 0 | 7 or $\overline{7}$ | 1 0 0 | 1 1 1 | |
| 1 0 1 | 8 or $\overline{8}$ | 1 0 1 | 1 1 0 | |
| 1 1 0 | 9 or $\overline{9}$ | 1 1 0 | 1 1 0 | |
| 1 1 1 | 10 or $\overline{10}$ | 1 1 1 | 1 0 0 | |
| I | II | III | IV | V |

The 15 variations of Table 2 formed by the bits $a\,b\,c\,d$ (the variation 0000 being omitted for the time being) together with the 8 possible manifestations of the bits $e\,f\,g$ (Table 3) give 8×15=120 variations in the ternary code. However, there still remains 8 variations, the $a\,b\,c\,d$ bits of which having the 0000 configuration, which have to be converted.

To achieve this purpose the bits $e\,f\,g$ (column I Table 3) take the place of the bits $a\,b\,c$ (column III Table 3) and are completed by three consecutive bits $d\,e\,f$ (column IV) to form another group of bits. Apart from the variation $a\,b\,c$ = 000, the seven remaining variations contain nought, one, or two 0-bits. Consequently, these variations can be easily completed to 6-bit variations containing two 0-bits. This is shown in column IV Table 3. The variation 000 is inverted to 111 and the configuration 001 is assigned to the bits $d\,e\,f$ (column V). So the 7-bit variation 0000000 becomes the 6-bit variation 111001. For the conversion of the (8×15) 6-bit variations (Table 3 columns I and II) into the ternary code the + and −, the distribution numbers 1, 2, 3, 4, 7, 8, 9 and 10 (Table 1) are used as stated already. The 8 remaining variations (Table 3 columns III) are converted into the ternary code according to the distribution 5 (Table 1).

Consequently, the conversion table is as follows:

TABLE 4

| 7 bits a b c d | e f g | | 6 bits a b c | d e f | | |
|---|---|---|---|---|---|---|
| 0 0 0 0 | 0 0 0 | ↑ | 1 1 1 | 0 0 1 | | |
| 0 0 0 0 | 0 0 1 | see | 0 0 1 | 1 1 1 | distribution | |
| | 0 1 0 | | 0 1 0 | 1 1 1 | | |
| | 0 1 1 | | 0 1 1 | 1 1 0 | 5 | |
| | 1 0 0 | Table | 1 0 0 | 1 1 1 | 8 variations | |
| | 1 0 1 | 3 | 1 0 1 | 1 1 0 | | |
| | 1 1 0 | | 1 1 0 | 1 1 0 | | |
| | 1 1 1 | ↓ | 1 1 1 | 1 0 0 | | |
| 0 0 0 1 | | ↑ | 1 1 1 | 0 0 1 | | |
| 0 0 1 0 | | | 1 1 0 | 1 0 1 | distribution | |
| 0 0 1 1 | | | 0 0 1 | 1 1 1 | | |
| 0 1 0 0 | | see | 1 0 1 | 1 0 1 | 1, 2, 3, 4, | 128 |
| 0 1 0 1 | | | 0 1 0 | 1 1 1 | 7 or $\overline{7}$, 8 or $\overline{8}$ | variation |
| 0 1 1 0 | | Table | 0 1 1 | 0 1 1 | 9 or $\overline{9}$, 10 or $\overline{10}$ | |
| 0 1 1 1 | | | 0 1 1 | 1 1 0 | | |
| 1 0 0 0 | | | 0 1 1 | 1 0 1 | | |
| 1 0 0 1 | 2 | | 1 0 0 | 1 1 1 | 15 × 8 = 120 variations | |
| 1 0 1 0 | | | 1 0 1 | 0 1 1 | | |
| 1 0 1 1 | | | 1 0 1 | 1 1 0 | | |
| 1 1 0 0 | | | 1 1 0 | 0 1 1 | | |
| 1 1 0 1 | | | 1 1 0 | 1 1 0 | | |
| 1 1 1 0 | | | 1 1 1 | 0 1 0 | | |
| 1 1 1 1 | | ↓ | 1 1 1 | 1 0 0 | | |

When one of the distributions $\overline{7}, \overline{8}, \overline{9}$, or $\overline{10}$ has been used for encoding, the conversion that has to follow a distribution of that group, must make use of the distribution 7, 8, 9, or 10.

This is shown by way of an example in FIG. I of the drawing. Specifically this FIG. I shows three successive 7-bit words $a,b,c,d,e,f,g$ of the binary code with their 0 and 1-bit indications below them. The first 4-bits are divided out between the vertical stepped lines to form the new 0 and 1-bit constant ratio code according to Table 2. The last 3-bits of the original binary code, namely bits $e\,f\,g$ of each of these 6-unit words, is then converted according to Table 3 columns I and II which indicate which line in Table 1 the 1-bits are to be converted and distributed to the + and − bits. Below each of these three successive signals, there is shown a wave form corresponding to the converted ternary signal words. The second and third words are shown to be unbalanced in their + and − bits, but together they form a balanced pair thereby eliminating the overall D.C. component when both signals are successively transmitted. As pointed out in Tables 1 and 3 any combination of the last three bits of the binary $e\,f\,g$ which are converted according to 7, 8, 9, or 10, the following signal which is converted according to any one of these four conversions is inverted to eliminate any overall D.C. component or unbalance in the final ternary code.

II

Conversion Of Signals Of An 8-bit Binary Code With $2^8 = 256$ Variations Into A 7-Bit Error Detecting Ternary Code The 7-digit code used on the transmission path is derived from a 7-bit code with a 1-bit/0-bit ratio of 4:3. The three levels at which the ternary transmission takes place are represented by the symbols O, + and −. The 0-value in the binary code also becomes the 0-value in the ternary encoding. The binary 1 bit becomes $a +$ or $-$ bit in the ternary code. The 7-bit code contains four 1-bits per signal. The error detection is obtained by counting the number of 0-digits in the 7-digit signal. This number must be three. Deviations of this number indicate an erroneously received signal. As the number of 1-bits in the 7-bit signal is even, it is possible to establish a balance between the number of + and − bits or digits. This balance can be formed within one signal or after some signals have been converted, so that the D.C. component is eliminated in due time. The distribution of the + and − values over four binary 1-bits takes place according to Table 1 .

The conversion of 8-bit signals into 7-bit signals is achieved as follows:

The 8-bit signals consist of the bits $a\,b\,c\,d\,e\,f\,g\,h$. Of these bits a first group of 5-bits, namely bits $a\,b\,c\,d\,e$, is detached or divided from the 8-bit binary code signals and converted into a 7-bit code with a constant 1 to 0-bit ratio according to well known conversion apparatus, such as described and disclosed in SITO 6301 or CCIR Rec. 476, or U.S. Pat. No. 3,601,539 of da Silva issued Aug. 24, 1971, and U.S. Pat. No. 2,518,405 issued Aug. 8, 1950. The remaining bits $f\,g\,h$ of this 8-bit binary code signal can occur in eight different variations according to Table 5 (see also Tables 1 and 3) so as to produce $32 \times 8$ or $2^5 \times 8 = 256$ variations.

TABLE 5

|  | f g h | + and −<br>distribution<br>(according to Table 1) |
|---|---|---|
| I | 0 0 0 | 1 |
|  | 0 0 1 | 2 |
|  | 0 1 0 | 3 |
|  | 0 1 1 | 4 |
| II | 1 0 0 | 7 or $\overline{7}$ |
|  | 1 0 1 | 8 or $\overline{8}$ |
|  | 1 1 0 | 9 or $\overline{9}$ |
|  | 1 1 1 | 10 or $\overline{10}$ |

By converting the bits $a\,b\,c\,d\,e$ into a 7-bit code the places of the 1-bits in the signal are determined.

The distribution of the + and − digits over the 1-bits is determined with the help of the eight possible variations of the bits $f\,g\,h$ shown in Table 5 above. If a distribution of the group II in Table 5 above has been chosen, the next distribution in that group II will be composed of the inverse values, as one of the distributions $\overline{7}, \overline{8}, \overline{9}$ or $\overline{10}$. This is shown by way of an example in FIG. II of the drawings which shows three successive 8-bit binary code words and their corresponding 0 and 1-bit codes, of which the first group of the first 5-bits are directly converted according to the above mentioned standard five to seven constant ratio code as shown between the stepped vertical lines, in which each word of 7-bits contains three and only three 0-bits for error detection and control. The next conversion is to determine which one of the 1-bits are to be converted to + and − bits, and this is done in accordance with the second group of the last three bits in the 8-unit binary code signal as shown in Tables 5 and 1. Here again the first signal A is unbalanced with three − bit and one + bit, so that the next signal which was unbalanced the same way is inverted, namely the third signal C, so that it contains three + bits and one − bit, so that after a few words the resulting signals have no D.C. component.

III

An Apparatus

FIG. III shows a circuit for the conversion of an 8-bit binary code word into a 7-bit ternary balanced code word. Generally speaking, the input circuit 10 separates the first five bits of each 8-bit code word from the three last bits. The bit word converter 20 converts the five first bits into a 7-bit fixed-rate or ratio code word with four 1 bits and three 0 bits. The polarity converter 30 converts the three last bits (according to Table 5 above and Table 6 below) into a 4-bit word (according to Tables 6 and 1) which controls the polarity of the 1 bits in the converted 7-bit code word from circuit 20. The polarity equilibrium watching circuit 40 takes care that any time the polarity equilibrium is disturbed, one of the next following 4-bit words will be inverted in order to restore polarity equilibrium. The output circuit 50 consists of two relays which brings the output to +, −, or 0 level.

More specifically in FIG. III, a bit word of eight bits (a,b,c,d,e,f,g,h) enters the input 11 and is divided in circuit 12 into the first five bits and its last three bits. The first five bits (a, b, c, d, e) are passed via fine parallel conductors or lines in conductor 13 to the bitword converter circuits 20 to a constant ratio code converter 21 for conversion into a 7-bit code word with a fixed bit rate of four 1 bits and three 0 bits as disclosed in above mentioned U.S. Pat. Nos. 3,601,539 and 2,518,405. This 7-bit word is entered into the 7-stage register 23 bit by bit during time slots generated by clock pulses from oscillator 24, and then the 7-bits of this word are successively fed via connection 25 to a relay 51 which operates a contact 52 each time a 1 bit appears. So, if a 0 bit leaves the shift register 23, the output 53 remains connected to the ground or 0 level through switch 52 and, if a 1 bit leaves the shift register 23, the output 53 is connected to switch 55 and thence either to a + or − potential or level.

The last three bits (f, g, h) of the binary code word from the divider 12 are connected via three parallel lines in conductor 14 to the polarity converter circuit 30 where they are converted by code converter 31 into code words of four-bits according to Table 6 below and brought into the output register (not shown) of the converter 31.

TABLE 6

| Converter 31 input 14<br>f g h | Converter 31 output<br>(corresponding to Tables 5 and 1;<br>"1" equals "+", "0" equals "−") | |
|---|---|---|
| 0 0 0 | 1 1 0 0 | |
| 0 0 1 | 0 1 1 0 | group I |
| 0 1 0 | 0 0 1 1 | |
| 0 1 1 | 1 0 0 1 | |
| 1 0 0 | 1 0 0 0 | |
| 1 0 1 | 0 1 0 0 | group II |
| 1 1 0 | 0 0 1 0 | |
| 1 1 1 | 0 0 0 1 | |

The 4-bit code words from converter 31 can belong to group I, in which a code word always consists of two 0 bits and two 1 bits, or to group II, in which there is no equilibrium between the number of 0 bits and the number of 1 bits. These converted 4-bit words are entered into a shift register 33 after the time slot 7 (see FIG. IV). Simultaneously the change-over circuit 41 identifies the 4-bit words as belonging to group 1 or to group II of Table 1. If the 4-bit word belongs to group I, the flip-flop 44 is set so that its output 47 is at the 0 status or level, and if the word belongs to group II the flip-flop 44 is alternately set into the same and the reverse status or level (see the time diagram of FIG. IV). The 4-bit words leave the shift register 33 under the control of a pulse shaper 32 which generates a pulse each time a 1 bit passes connection 25. As every 7-bit word passing connection 25 contains four 1 bits, the shift register 33 will be empty when shift register 23 is empty, so thereafter the two shift registers are able to receive the next or a new code word.

Referring now to FIG. III together with the time diagram of FIG. IV, during time slots 2 to 8 the first 7-bit signal converted from the first five bits of the first 8-bit word II A has stepped into the seven stages of the shift register 23, and now during the time slots 8 through 14 a new signal B enters the shift register 23 from the converter 21 while the stored signal A in register 23 is driven out step-by-step through the conductor 25 as described above. During the shifting-through of this new signal B the shift register 33 puts a 1 level on its output 35 and a 0 level on its output 34 for every 1-bit leaving the shift register 33, which in this instance according to FIG. IV is only during the eighth time slot for this new signal. Similarly, for every 0-bit from the fourth stage of the shift register 33, the output 34 of this shift register 33 is brought to the 1 level and the output 35 is changed to a 0 level. Thus after the first 1 level or 1-bit from the output of the shift register 23 which will be transmitted as a + bit, the other three 1-bits in the output from register 23 will be transmitted as − bits because they correspond to the other three 0-bits of the output of the code converter 31, namely the seventh combination from group II of Tables 1 and 6. Since this is the first unbalanced signal from the code converter 31, and the change-over circuit only operates for every alternate unbalanced signal, no change-over of this circuit yet occurs.

Referring now further to signal B, it is a balanced signal at the output 31 of the code converter and therefore the change-over circuit is not operated. Since in this particular group I signal number 3 has only the second two bits +, corresponding only the second two 1-bit of the final 7-bit code signal B are converted for this signal between the time slots 15 to 21 as shown by the dotted arrows between the output 32 and the conductor 35 in the time table of FIG. IV.

The third signal C which occurs at the output of the pulse shaper 32 during the time slots 22 through 28, is the second unbalanced signal from group II and correspondingly is to be inverted as being the $\overline{9}$ signal from the output as determined from the output from the code converter 31 according to Tables 5 and 1. Thus this 4-bit signal $\overline{9}$ now operates the change-over circuit 41 to operate the flip-flop 44 and invert the polarity on the outputs 46 and 47 from the flip-flop 44 from 0 and 1 to 1 and 0, respectively, (see FIG. IV). This changeover occurs only during the 6-bits of the signal C between time slots 22 and 28. Thus, the normal first two 1-bits of this signal C which normally would correspond to 0 bits are now 1-bits and operate the AND-gate 37 to pass through OR-gate 39 to operate relay 44. The third bit of the 4-bit control signal from code converter 31, which normally is a 1-bit is now inverted to be a 0-bit and it thus blocks the AND-gate 37 to produce the first − bit in the signal C. Then the last 1-bit in the 4-bit control signal which is a 0 bit at the output from the code converter 31, transmits the last 1 bit of this signal C as a + bit Now the signal wave across the bottom of FIGS. II and IV is balanced, in that for the two unbalanced signals A and C, one has been inverted with respect to the other, while the signal B is already balanced.

Also shown in the time diagram of FIG. IV is the balanced code signal D derived from the special 8-bit code signal having all 0-bits. Its transformation in the 5 to 7 constant ratio code converter 21 produces a 7-bit word or signal which is correspondingly passed through the seven stages of the shift register 23. The four 1-bits in this converted signal D operate the shift register 33 in combination with the 4-bit signal converted from the last three bits of the original 8-bit signal in accordance with signal 1 in Tables 5 and 1 to produce the 4-bit word of two 1 bits followed by two 0 bits.

The conversion of each of the 5-unit binary code signals (which are divided from the 8-unit binary code by divider 12) into the 7-unit binary code in the code converter 21, may be as shown in Table 7 below, in which table this particular code signals A, B, C and D shown and described in FIGS. II and IV are specifically indicated. This table is in accordance with the International Conversion Table and Standards published in the CCIR (mentioned previously).

TABLE 7

|   |         |         |
|---|---------|---------|
| D | 0 0 0 0 0 | 0 1 0 1 0 1 1 |
|   | 0 0 0 0 1 | 0 0 1 0 1 1 1 |
|   | 0 0 0 1 0 | 0 0 0 1 1 1 1 |
|   | 0 0 0 1 1 | 1 0 0 0 1 1 1 |
|   | 0 0 1 0 0 | 0 0 1 1 1 0 1 |
|   | 0 0 1 0 1 | 1 0 0 1 0 1 1 |
|   | 0 0 1 1 0 | 1 0 0 1 1 0 1 |
|   | 0 0 1 1 1 | 1 0 0 1 1 1 0 |
|   | 0 1 0 0 0 | 0 0 1 1 0 1 1 |
|   | 0 1 0 0 1 | 1 0 1 0 0 1 1 |
|   | 0 1 0 1 0 | 1 0 1 0 1 0 1 |
|   | 0 1 0 1 1 | 1 0 1 0 1 1 0 |
| A | 0 1 1 0 0 | 1 0 1 1 0 0 1 |
|   | 0 1 1 0 1 | 1 0 1 1 0 1 0 |
|   | 0 1 1 1 0 | 1 0 1 1 1 0 0 |
|   | 0 1 1 1 1 | 0 0 1 1 1 1 0 |
|   | 1 0 0 0 0 | 0 1 1 0 1 0 1 |
|   | 1 0 0 0 1 | 1 1 0 0 0 1 1 |
|   | 1 0 0 1 0 | 1 1 0 0 1 0 1 |
|   | 1 0 0 1 1 | 0 1 0 0 1 1 1 |
|   | 1 0 1 0 0 | 1 1 0 1 0 0 1 |
|   | 1 0 1 0 1 | 1 1 0 1 0 1 0 |
| B | 1 0 1 1 0 | 1 1 0 1 1 0 0 |
|   | 1 0 1 1 1 | 0 1 0 1 1 1 0 |
|   | 1 1 0 0 0 | 1 1 1 0 0 0 1 |
| C | 1 1 0 0 1 | 1 1 1 0 0 1 0 |
|   | 1 1 0 1 0 | 1 1 1 0 1 0 0 |
|   | 1 1 0 1 1 | 0 1 1 0 1 1 0 |
|   | 1 1 1 0 0 | 0 1 1 1 0 0 1 |
|   | 1 1 1 0 1 | 0 1 1 1 0 1 0 |
|   | 1 1 1 1 0 | 0 1 1 1 1 0 0 |
|   | 1 1 1 1 1 | 0 1 0 1 1 0 1 |

While there is described above the principles of this invention in connection with specific apparatus, it is to be clearly understood that this description is made only by way of example, and not as a limitation to the scope of this invention.

We claim:

1. A system for converting n-bit binary code signals of more than three bits per signal of 1 and 0 bits into a ternary balanced code signal of $n-1$ bits of 0, + and − bits per ternary code signal, wherein each ternary signal has the same number of 0-bits, comprising:
   A. means for dividing each signal of said binary code into two groups of units, the first group consisting of the first $n-3$ bits of each code signal,
   B. means for converting said first group of bits into the first $n-1$ bits having a constant ratio of 0 and 1-bits per signal,
   C. means for converting the 1-bits of said first group of bits into + and − bits according to the second group of the last 3-bits of each binary code signal, and
   D. means for inverting the + and − bits in alternate ternary code signals having the same unevenness in the number of + and − bits, so that after a few converted ternary signals any D.C. component in said ternary signals is eliminated.

2. A system according to claim 1 wherein said n-bit binary code consists of seven units per signal.

3. A system according to claim 1 wherein said n-bit binary code consists of eight units per signal.

4. A system according to claim 1 wherein each of said means for converting includes a shift register.

5. A system according to claim 1 wherein said means for inverting comprises a flip-flop circuit.

6. A system according to claim 1 wherein each of said means for converting comprises a relay having a switch and each switch is connected for connection to three different potentials corresponding to 0; +, and − bits.

7. A system according to claim 1 wherein said inverting means is connected to said means for converting the 1-bits of said first group of bits.

8. A system according to claim 1 wherein said means for connecting the 1-bits of said first group of bits comprises a converter for the last three bits divided from said 8-bit binary code signal.

9. A system according to claim 8 wherein said dividing means is connected to said converters for the first group of bits and the three bits.

10. A system according to claim 8 wherein said inverting means is connected to said converter for the last three bits.

* * * * *

UNITED STATES PATENT OFFICE
CERTIFICATE OF CORRECTION

Patent No. 4,003,041    Dated January 11, 1977

Inventor(s) Henrik Cornelis Anthony van DUUREN and Herman da SILVA

It is certified that error appears in the above-identified patent and that said Letters Patent are hereby corrected as shown below:

In the Abstract, line 3, change "with" to - - without - -. Column 3, line 29, change "$\overline{7}, \overline{8}, \overline{9},$ and $\overline{10}$" to - - 7, 8, 9, and 10 - -; lines 30 and 31, change "7, 8, 9, 10" to - - $\overline{7}, \overline{8}, \overline{9}, \overline{10}$ - -. Column 4, line 22, change "0 1" to - - 0-1 - -. Column 6, line 2 up, change "$\overline{7}, \overline{8}, \overline{9}$ or $\overline{10}$" to - - 7, 8, 9 or 10 - -. Column 7, line 2, change "7, 8, 9 or 10" to - - $\overline{7}, \overline{8}, \overline{9}$ or $\overline{10}$ - -; line 22, after "binary" insert - - code - -. Column 9, line 4, change "fine" to - - five - -.

Signed and Sealed this

Twenty-sixth Day of April 1977

[SEAL]

Attest:

RUTH C. MASON
*Attesting Officer*

C. MARSHALL DANN
*Commissioner of Patents and Trademarks*

UNITED STATES PATENT OFFICE
CERTIFICATE OF CORRECTION

Patent No. 4,003,041  Dated January 11, 1977

Inventor(s)  Henrik Cornelis Anthony van Duuren

It is certified that error appears in the above-identified patent and that said Letters Patent are hereby corrected as shown below:

Page 1 [73], should read -- De Staat Der Nederlanden, Ten Deze Vertegenwoordigd Door De Directeur-Generaal Der Posterijen, Telegrafie En Telefonie, The Hague, Netherlands --.

Signed and Sealed this twelfth Day of July 1977

[SEAL]

Attest:

RUTH C. MASON
Attesting Officer

C. MARSHALL DANN
Commissioner of Patents and Trademarks